United States Patent [19]

Makinwa

[11] Patent Number: 5,889,237
[45] Date of Patent: Mar. 30, 1999

[54] DATA PROCESSING SYSTEM COMPRISING A GRAPHIC TABLET AND A STYLUS AND STYLUS FOR USE IN SUCH A SYSTEM

[75] Inventor: Kofi A. A. Makinwa, Eindhoven, Netherlands

[73] Assignee: U.S. Philips Corporation, New York, N.Y.

[21] Appl. No.: 560,237

[22] Filed: Nov. 21, 1995

[30] Foreign Application Priority Data

Nov. 24, 1994 [EP] European Pat. Off. .............. 94203413

[51] Int. Cl.⁶ .................................................. G08C 21/00
[52] U.S. Cl. .................................. 178/18.01; 178/18.03; 178/18.07; 178/18.1; 178/19.01; 178/19.03
[58] Field of Search ..................................... 345/173, 158, 345/179, 180; 178/18.01, 18.03, 18.07, 18.1, 19.01, 19.03

[56] References Cited

U.S. PATENT DOCUMENTS

| | | | |
|---|---|---|---|
| 4,672,154 | 6/1987 | Rodgers et al. ........................... | 178/19 |
| 4,686,332 | 8/1987 | Greanias et al. ........................... | 178/19 |
| 5,007,085 | 4/1991 | Greanias et al. ........................ | 345/180 |
| 5,225,637 | 7/1993 | Rodgers et al. ........................... | 178/19 |
| 5,231,381 | 7/1993 | Kuwaer ................................... | 340/712 |
| 5,355,100 | 10/1994 | Riggio, Jr. .............................. | 345/179 |
| 5,369,227 | 11/1994 | Stone ......................................... | 178/18 |
| 5,461,204 | 10/1995 | Makinwa ................................. | 178/19 |
| 5,534,892 | 7/1996 | Tagawa ................................... | 345/173 |

FOREIGN PATENT DOCUMENTS 4-140818   5/1992   Japan ................................ G06F 3/03

*Primary Examiner*—Vijay Shankar
*Attorney, Agent, or Firm*—Brian J. Wieghaus

[57] ABSTRACT

In a data processing system comprising a graphic tablet and a wireless stylus cooperating with the tablet, the stylus is activated by an activation signal transmitted by a display screen integrated with the tablet. For the activation signal use is made of a signal which is transmitted any way by the display screen in the normal operational mode. The stylus is arranged to receive the signal and to change over from a battery-saving standby mode to an operational mode upon reception of this signal.

20 Claims, 3 Drawing Sheets

5,889,237

DATA PROCESSING SYSTEM COMPRISING A GRAPHIC TABLET AND A STYLUS AND STYLUS FOR USE IN SUCH A SYSTEM

BACKGROUND OF THE INVENTION

The invention relates to a data processing system, comprising a graphic tablet, a wireless stylus capable of transmitting a stylus signal which serves for the detection of a position of the stylus relative to the tablet, and activation means for activating the stylus under the influence of a wireless activation signal.

The invention also relates to a stylus for use in such a system.

Simplicity and ease of operation are important aspects of the user interface in a data processing system. Therefore, contemporary user interfaces increasingly utilize a graphic tablet and a stylus cooperating with the tablet in order to enter commands, selections or text. In such an application the stylus transmits a given stylus signal which is received by loops in the tablet. The received signal is used to determine the position of the stylus relative to the tablet and this position is used as input for the system. A combination of a graphic tablet with a display screen is described in European Patent Application EP-A 0 421 025 (U.S. Pat. No. 5,231,381; PHN 13.100). This combination provides a versatile user interface with a variety of possibilities for interaction. For example, the display screen can display a dynamically adaptable menu in which the user can indicate a given option by means of the stylus. Another possibility is the acknowledgement on the display screen of information entered by means of the stylus; for example when handwritten text is entered by means of the stylus the result can be displayed directly on the display screen in the same way as if writing takes place by a pen on paper in a traditional manner.

U.S. patent application Ser. No. 08/278209 (PHN 14.792), assigned to Applicant of the present Application, describes a stylus where the stylus signal is dependent on the pressure with which the stylus is pressed onto the tablet. The stylus comprises a device whereby the transmitted stylus signal is detuned in a suitably detectable manner, whereas the tip of the stylus slides into the stylus over a very short distance only.

A system of the kind set forth in the opening paragraph is known from Japanese Abstract 4-140818. This system comprises a stylus with a battery for delivering power for the transmission of the stylus signal. The energy in the battery is limited and replacement is cumbersome and expensive. In the known system the stylus is switched on by detection of a code signal which is transmitted specifically for this purpose by a facility provided in the tablet.

It is an object of the invention to provide a system of the kind set forth in which the operational life of the battery in the stylus is prolonged and which does not require an additional facility to transmit a signal for activating the stylus. To this end, the system in accordance with the invention is characterized in that the tablet is suitable, by way of a display screen included therein, to transmit the wireless activation signal as a consequence of an operational behaviour of the display screen, and that the stylus comprises activation means and is arranged to receive the activation signal transmitted by the display screen. The stylus is now switched on in the presence of a signal which is transmitted any way as an interference signal by the display screen. Consequently, no special facility need be designed and constructed, resulting in lower costs and higher reliability in comparison with the known system.

SUMMARY OF THE INVENTION

An embodiment of the system in accordance with the invention is characterized in that the activation means comprise a detector for detecting the activation signal and a switch for activating the stylus, the detector being arranged to operate the switch. The detector and the switch can be simply and inexpensively constructed as part of the electronic circuitry already present in the stylus.

An embodiment of the system in accordance with the invention is characterized in that the detector comprises an aerial for receiving the activation signal. Providing the detector with an aerial improves the reception of the activation signal transmitted by the display screen.

An embodiment of the system in accordance with the invention is characterized in that the detector is arranged to compare the level of the activation signal at the area of the stylus with a predetermined threshold level and to operate the switch on the basis of the comparison result. This prevents activation of the stylus under the influence of other, more remote display screens or other apparatus transmitting similar signals.

An embodiment of the system in accordance with the invention is characterized in that the activation means are arranged to determine whether the activation signal is below a second predetermined threshold level for a predetermined period of time, and to switch the stylus to a standby mode on the basis of said determination. Excessively fast or sudden switching of the stylus to the battery-saving standby mode, for example when the stylus briefly leaves the vicinity of the display screen, is undesirable. The above steps ensure that the stylus is switched to the standby mode whenever appropriate.

An embodiment of the system in accordance with the invention is characterized in that the stylus is fully switched off in the standby mode. This offers the advantage that a stylus which is not in operational use does not draw energy from the battery. The detector is then arranged to derive adequate power from the activation signal so as to activate the stylus.

An embodiment of the system in accordance with the invention is characterized in that the detector is sensitive to a frequency of the activation signal which is between a predetermined first frequency and a predetermined second frequency. This offers the advantage that the stylus is not unintentionally switched on when it is present in the vicinity of other sources of interference signals. The other sources are precluded from switching on the stylus by making the detector selectively sensitive to the appropriate signal from the display screen.

It is another object of the invention to provide a stylus which is suitable for use in a system as described above and in which the operational life of the battery is prolonged. To this end, the stylus in accordance with the invention comprises activation means for switching on the stylus in the presence of an activation signal transmitted by the display screen. Various embodiments of the activation means have already been described and discussed above.

BRIEF DESCRIPTION OF THE DRAWINGS

The invention will be described in detail hereinafter, by way of example, with reference to the drawing; therein.

DESCRIPTION OF THE PREFERRED EMBODIMENTS

Figure 1:
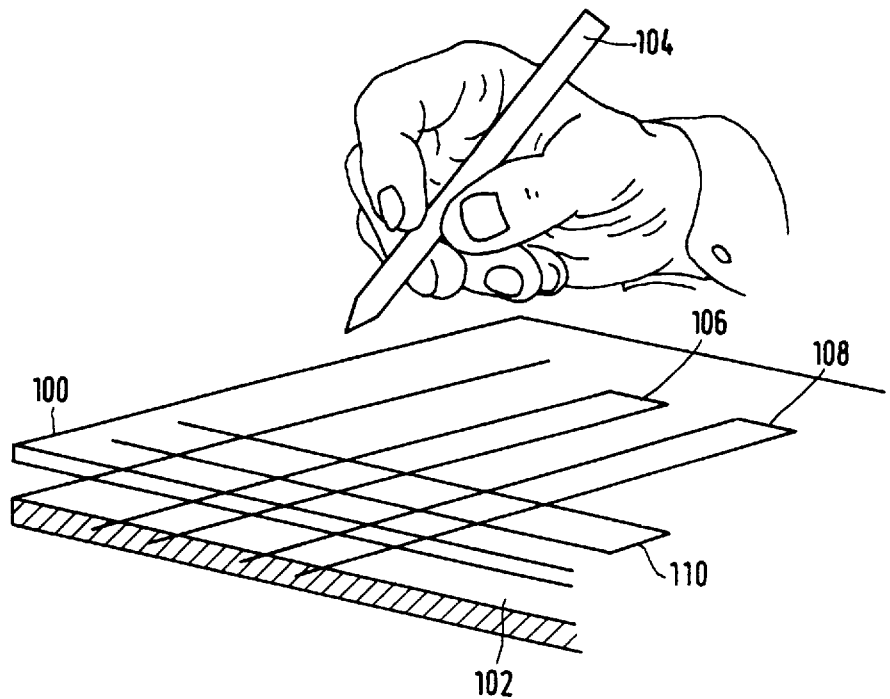
FIG. 1 shows a part of a data processing system.

FIG. 1 shows a part of a data processing system in which the invention is used. This part comprises a display screen 100, a graphic tablet 102 and a stylus 104. The display screen and the tablet are integrated, with a given spacing, so as to form one unit. The display screen displays, for example a menu, acknowledgement of stylus motions, or other system output. The tablet 102 comprises a number of electrically conductive loops, for example loops 106, 108 and 110 which serve to determine the position of the transmitting stylus 104 relative to the tablet 102. The operation of the system is described in detail in European Patent Application EP-A 0 421 025 (U.S. Pat. No. 5,231,381; PHN 13.100).

Figure 2:
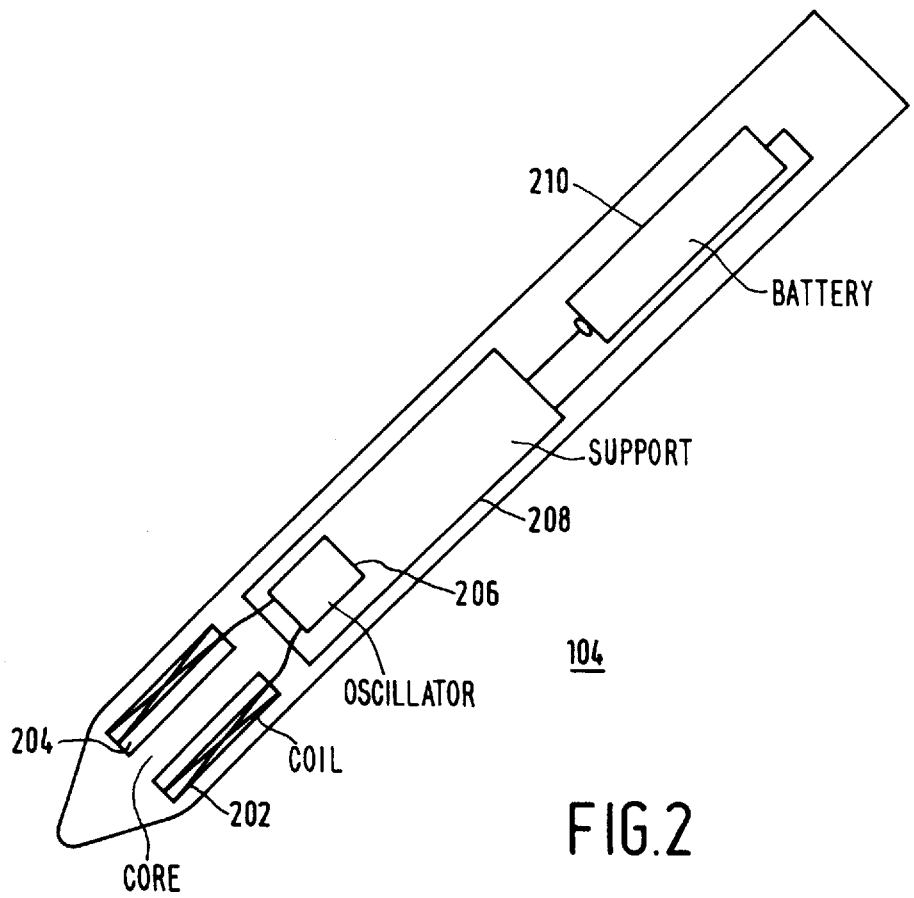
FIG. 2 shows diagrammatically a stylus for use in the system.

FIG. 2 shows diagrammatically some components of the stylus 104. The stylus comprises a coil 202 which is wound about a core 204. The coil 202 is connected to an oscillator circuit 206 which is accommodated on a support 208, together with other electronics, and transmits a stylus signal when the stylus is in an operational state. The stylus also comprises a battery 210 which serves inter alia to deliver power for the transmission of the stylus signal.

Figure 3:
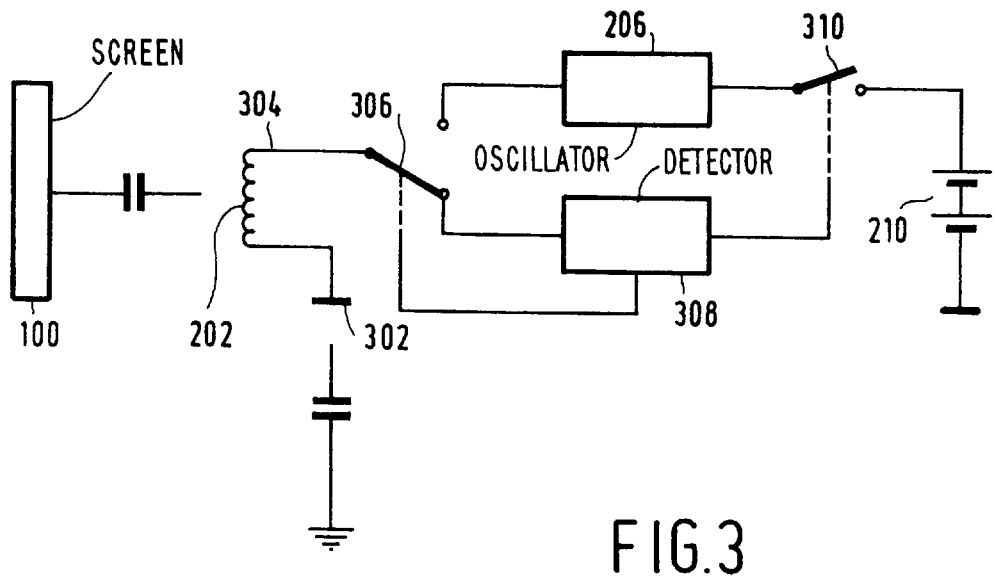
FIG. 3 shows a block diagram of an embodiment of the invention.

FIG. 3 shows a block diagram of an embodiment of the invention. The display screen 100 transmits a number of interference signals in the course of normal operation. One of the interference signals is used as an activation signal for the stylus. In the absence of the activation signal, the stylus is in a battery-saving standby mode. In this mode the stylus is enabled for the reception of the activation signal and as soon as this signal is actually received, the stylus enters an operational mode for the transmission of the stylus signal. In the embodiment shown in FIG. 3, the activation signal transmitted by the display screen is received by the coil 202 via capacitive coupling. Because one side 302 of the coil is capacitively coupled to ground, for example via a hand of the user, an electric signal arises at the side 304 of the coil. In the standby mode a switch 306 is in its lower position, so that said electric signal is applied to a detector 308 which, as a consequence, closes the switch 310 so that a supply voltage is applied to the oscillator circuit 206. Moreover, the switch 306 is then set to its upper position, after which the stylus starts to transmit the stylus signal. In a given embodiment the detector is arranged to set the switch 306 to its lower position at regular intervals, for example every 10 seconds, in order to check whether the activation signal from the display screen is still present. If this is not the case, the switch 310 can be opened, so that the voltage to the oscillator circuit is interrupted and the stylus enters the standby mode.

The detector 308 in a given embodiment switches on the switch 310 only if the level of the signal at the point 304 exceeds a given threshold level. The sensitivity of the detector circuit is thus adapted to the system conditions and the stylus is prevented from entering the operational mode under the influence of other, more remote display screens or of other equipment. During the regular checking for the presence of the activation signal in the operational mode, the detector 308 can compare the signal with a second threshold level and switch off the switch 310 only if the signal is below said second threshold level.

The invention provides a longer operational life of the battery in that the power consumption of the stylus in the standby mode is much lower than that in the operational mode, i.e. approximately 5 $\mu$A in the standby mode versus approximately 50 $\mu$A in the operational mode. Switching the stylus on and off in the described manner offers substantial advantages in comparison with a mechanical switch. The detector circuit 308 and the switches 306 and 310 can be very simply and inexpensively included in the other electronic circuitry required for normal operation of the stylus. A mechanical switch is much more expensive and necessitates various mechanical adaptations in the production of a stylus.

Figure 4:
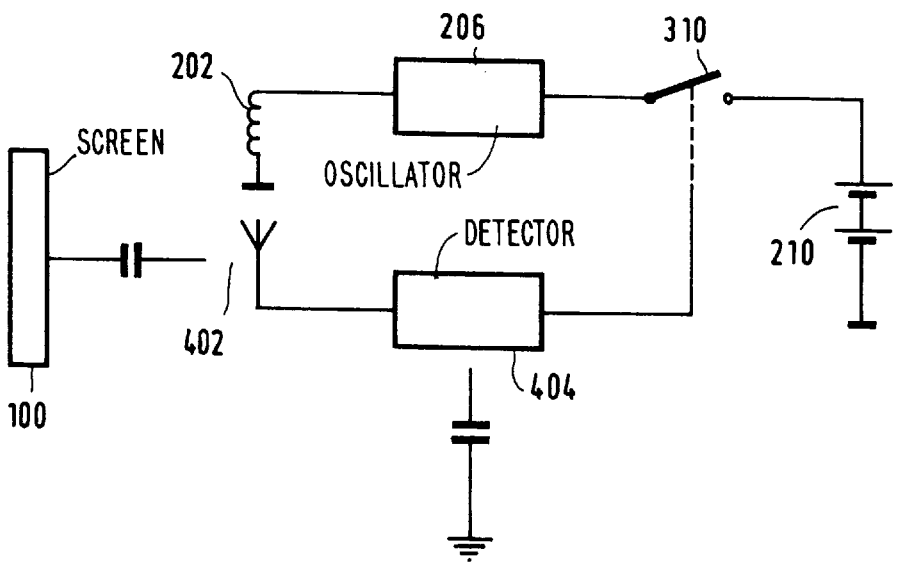
FIG. 4 shows an alternative embodiment of the invention.

FIG. 4 shows an alternative embodiment of the invention. Therein, the activation signal is received via a separate aerial 402 so as to be applied to a detector 404. The detector 404 switches on the switch 310 in the presence of the activation signal, thus applying a supply voltage to the oscillator circuit. As a result, the stylus enters the operational mode and starts to transmit the stylus signal via the coil 202. The detector 404 continues to check the reception of the activation signal via the aerial 402 in the operational mode of the stylus. As soon as the signal disappears, the detector 404 switches over the switch 310, so that the oscillator circuit no longer receives a supply voltage and the stylus leaves the operational mode. This embodiment can also advantageously use predetermined threshold levels. In the standby mode the detector 404 compares the level of the activation signal received with a first threshold level and switches on the switch 310 only if the level exceeds the first threshold level. In the operational mode the detector 404 compares the level of the activation signal received with a second threshold level and switches off the switch 310 only if the level is below the second threshold level. Furthermore, the detector can be arranged so that switching off takes place only after the level has been below the second threshold level for some time.

Figure 5:
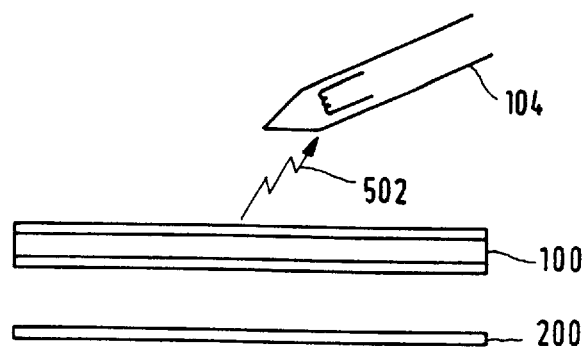
FIG. 5 shows an application of the M signal of an LCD as an activation signal in accordance with the invention.

FIG. 5 shows a circuit diagram of an application of the invention in the case of an LCD, the M signal then being used as the activation signal. In a display screen which is constructed as a liquid crystal display (LCD), the polarization of plates in which the crystals are situated is continuously reversed so as to prevent degradation. This reversal is effected by means of a given signal, i.e. the so-called M signal, of a given frequency. In the LCD of a system incorporating the invention the M signal has a frequency of 1 kHz. The M signal produces a stray field 502 which is sufficiently strong so as to be detected in the described manner in order to activate the stylus. Said detector in the stylus 104 is then designed to detect the M signal.

Figure 6:
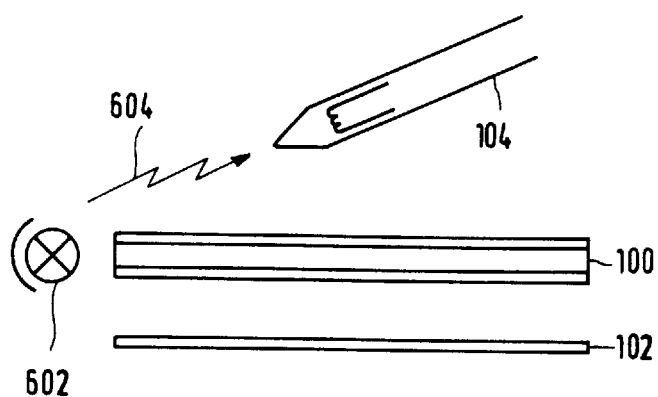
FIG. 6 shows an application of the drive signal for the light source of an LCD as an activation signal in accordance with the invention.

FIG. 6 shows a circuit diagram with an LCD in which the driving of the light source is used as the activation signal. An LCD in operation utilizes a light source so as to form an image on the screen. This source may be situated directly behind the screen, i.e. the so-called back light, or adjacent the screen, i.e. the so-called edge light 602 which irradiates the screen via a diffusor. Light sources of this kind are driven by an alternating voltage of a given frequency which is between 20 kHz and 100 kHz. This drive signal produces a stray field 604 which can also be used to activate the stylus when it approaches the display screen. In that case the detector in the stylus 104 is sensitive to receive the drive signal for the light source.

The display screen may be constructed as a monitor comprising a cathode ray tube. The signal driving the electron beam in the tube to the beginning of a next line, i.e. the so-called flyback, then constitutes a characteristic signal indicating the operational mode of the monitor. This signal has a frequency of approximately 15 kHz and is strong enough so as to be received at the area of the stylus. The detector in the stylus is then designed so that it is sensitive to receive this signal.

I claim:

1. A data processing system, comprising a graphic tablet, a stylus capable of transmitting a stylus signal which serves for the detection of a position of the stylus relative to the tablet, and activation means for activating the stylus under the influence of a wireless activation signal, characterized in that: the system further comprises a display screen adjacent the tablet, which display screen transmits the wireless activation signal as a consequence of an operational behavior of the display screen, and that the stylus comprises the activation means and is arranged to receive the activation signal transmitted by the display screen.

2. A system as claimed in claim 1, characterized in that the activation means comprise a detector for detecting the activation signal and a switch for activating the stylus, the detector being arranged to operate the switch.

3. A system as claimed in claim 2, characterized in that the detector comprises an aerial for receiving the activation signal.

4. A system as claimed in claim 2, characterized in that the detector is arranged to compare a level of the activation signal at the area of the stylus with a predetermined threshold level and to operate the switch on the basis of the comparison result.

5. A system as claimed in claim 1, characterized in that the activation means makes a determination as to whether the activation signal is below a second predetermined threshold level for a predetermined period of time, and to switch the stylus to a standby mode on the basis of said determination.

6. A system as claimed in claim 5, characterized in that the activation means are switched off in the standby mode of the stylus.

7. A system as claimed in claims 2, characterized in that the detector is sensitive to a predetermined frequency of the activation signal.

8. A system as claimed in claim 1, characterized in that the activation signal is one of the following signals: an M signal, an LCD screen illumination (back light or edge light), or a flyback signal.

9. A stylus for use in a system as claimed in claim 1.

10. A system as claimed in claim 3, characterized in that the detector is arranged to compare a level of the activation signal at the area of the stylus with a predetermined threshold level and to operate the switch on the basis of the comparison result.

11. A data processing system, comprising:
a display screen, said display screen emitting electromagnetic radiation during operation;
a positioning tablet adjacent the screen,
a stylus including transmitting means for transmitting a stylus signal, the positioning tablet receiving the stylus signal to determine the position of the stylus relative to the tablet, said stylus including activating means for activating the transmitting means, said activating means detecting the electromagnetic radiation from the display screen and activating the transmitting means in dependence on the electromagnetic radiation from the display screen.

12. A data processing system according to claim 11, wherein the electromagnetic radiation detected by said activating means for activating said transmitting means is radiation emitted by the display screen as a result of normal operation of the display screen, independent of the stylus.

13. A data processing system according to claim 12, wherein said screen is a CRT and said electromagnetic radiation detected by said activating means is a flyback signal of the CRT.

14. A data processing system according to claim 12, wherein said screen is an LCD including at least one of (i) a back light and (ii) an edge light driven at a driving frequency, and said electromagnetic radiation detected by said activating means is the driving frequency of said at least one of the back light and edge light.

15. A data processing system according to claim 12, wherein said screen is an LCD having an M signal and said electromagnetic radiation detected by said activating means is the M signal.

16. A data processing system, comprising:
a display screen, said display screen emitting electromagnetic radiation with a characteristic frequency signature at least recurrently during operation;
a positioning tablet adjacent the screen, a stylus including transmitting means for transmitting a stylus signal, the positioning tablet receiving the stylus signal to determine the position of the stylus relative to the tablet, said stylus including activating means for activating the transmitting means, and a battery for powering said transmitting means and said activating means, said transmitting means when activated having a higher power drain on said battery than when inactivated, said activating means detecting the electromagnetic radiation from the display screen and activating the transmitting means in dependence on detection of electromagnetic radiation from the display screen with (i) the characteristic frequency signature and (ii) a preselected signal strength corresponding to a selected distance of the stylus from the display screen, so that the transmitter is inactive and power drain on the battery is reduced when (i) the stylus is further from the screen than the selected distance from the display screen and (ii) the display screen is inoperative.

17. A data processing system according to claim 16, wherein the electromagnetic radiation detected by said activating means for activating said transmitting means is radiation emitted by the display screen as a result of normal operation of the display screen, independent of the stylus.

18. A data processing system according to claim 17, wherein said screen is a CRT and said electromagnetic radiation detected by said activating means is a flyback signal of the CRT.

19. A data processing system according to claim 17, wherein said screen is an LCD including at least one of (i) a back light and (ii) an edge light driven at a driving frequency, and said electromagnetic radiation detected by said activating means is the driving frequency of said at least one of the back light and edge light.

20. A data processing system according to claim 17, wherein said screen is an LCD having an M signal and said electromagnetic radiation detected by said activating means is the M signal.

* * * * *